Figure 1:
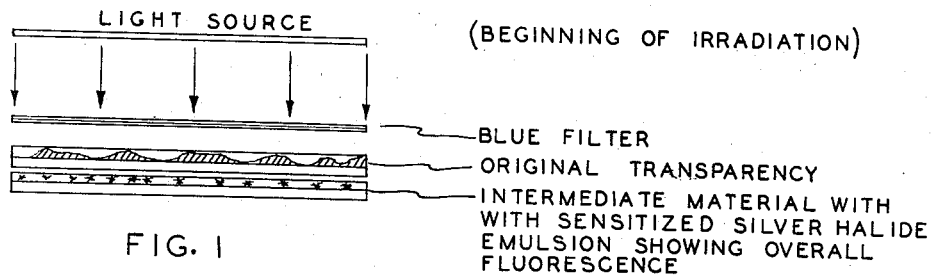

JOSEPH S. FRIEDMAN
LESTER HORWITZ
INVENTORS

United States Patent Office

2,865,744
Patented Dec. 23, 1958

2,865,744

FLUORESCENCE IN PHOTOGRAPHIC EMULSIONS AND DUPLICATING PROCESS USING SUCH FLUORESCENCE

Joseph S. Friedman, Binghamton, N. Y., and Lester Horwitz, Kansas City, Mo., assignors to General Aniline & Film Corporation, New York, N. Y., a corporation of Delaware Application January 26, 1956, Serial No. 561,668

4 Claims. (Cl. 96—27)

This invention relates to photography, to the fluorescence of dye sensitized emulsions, and more particularly to a process for forming duplicate image by the use of fluorescence in dye sensitized emulsions.

The fluorescence of pure silver halides and of photographic emulsions has, heretofore, been detected only at exceedingly low temperatures. Since the efficiency of latent image formation at low temperatures is not great, it was reasoned that the absorbed energy not utilized for latent image formation, may be re-emitted as fluorescence. At low temperatures other dissipative processes, such as vibrations and rotations, are minimal, enhancing the chances for fluorescent emission. This was demonstrated by earlier experiments which showed that silver halides in the pure state, in mixtures, and when dispersed in gelatin, emitted fluorescent light when excited by light which they absorbed. The emission lay in the green and red portions of the visible range, just to the long wave length side of the absorption bands of the various silver halides. It had a very high temperature dependence, the emission being very strong at 70 K. but no longer observable above 200 K. The dye sensitized emulsion behaved no differently from the unsensitized emulsion of otherwise identical composition. The same was true for other emulsion additives such as desensitizing agents, silver sulfide, silver-gelatin complexes.

These studies used ultraviolet radiation to excite the test materials. All made their observations at temperatures below 200 K. This excluded the second step involved in latent image formation, including the formation of silver ions.

It is an object of this invention to provide a process in which the fluorescence of dye sensitized photographic emulsions is used for the exposure of light sensitive materials and for the formation of duplicate prints.

Other objects will be apparent from the following description.

We have found that photographic emulsions containing sensitizing dyes influence the fluorescence emission at room temperatures. The irradiation of such emulsions with blue causes a fluorescence in the region of wave lengths longer than blue which are recorded by panchromatic materials after all of the blue light passing through the fluorescing emulsion is eliminated by the use of a yellow filter.

The exciting light was the blue transmitted by a Wratten #49B filter. The fluorescent light emitted by the test material was recorded upon a panchromatic film after filtration removed any exciting light that was transmitted by the test materials.

Four test materials were exposed to blue light simultaneously with an optical step wedge having densities ranging from 2.00 to 5.00. The emergent light was filtered to remove any blue that may have been passed, and recorded upon a panchromatic film. This filtration was not used for the light transmitted by the step wedge. The density of the image of the wedge served as an index whereby the intensities of the emergent light could be determined relative to that of the incident light.

The Wratten #49B filter (Wratten Filters, 18th edition) has a maximum transmission at 450 m$\mu$ and a transmission limit at 500 m$\mu$. The Wratten #16 filter starts its transmission at 510. For a normal exposure, therefore, the two are mutually exclusive. Exposures were adjusted so that the intensity of the light transmitted by the two filters in superposition, was recorded at a point just above the fog level on the characteristic H&D curve of the recording film.

In each experiment test material #1 was film base coated with a layer of plain gelatin. This served to measure the intensity of the light transmitted by the two filters in superposition. Test material #2 was unsensitized photographic emulsion coated upon film base. Test material #3 was film base coated with gelatin that contained an emulsion additive (e. g., sensitizing dye) in varying concentrations. Test material #4 was the same emulsion as used in test material #2 containing, in addition, emulsion additives in the same concentrations present in test material #3. All coatings were 5$\mu$ thick. The test materials were always interposed between the two filters with the blue facing the exposing light. The recording material was a panchromatic film commercially available as "Ansco Triple S Pan Film." It was developed for 10 minutes at 20° C., in a developer having the following composition:

| | Grams |
|---|---|
| p-Methylaminophenol sulfate | 1.5 |
| Sodium sulfite (anhydrous) | 45 |
| Sodium bisulfite | 1 |
| Hydroquinone | 3 |
| Sodium carbonate (monohydrate) | 6 |
| Potassium bromide | 0.8 |
| Water to make 1 liter. | |

If the density obtained in the recording film for any of the test materials exceeded that obtained for test material #1, those materials exhibited fluorescence. The intensity of the fluorescence, relative to that of the exposing light, was determined by the methods of photographic densitometry. The densities in the recording material formed by exposure through the optical step wedge were plotted against the densities (log exposure values) of the steps in the wedge. This constituted the characteristic H&D curve for the recording film. The log exposure value for each test material was determined from this curve and represents the negative of the logarithm of the ratio of the intensity of the emergent light to that of the incident. A value of 4.00 means that the intensity of the emergent light was $10^{-4.00}$ or one ten-thousandth that of the incident light. It was convenient to relate all findings to that of a reference point. This was accomplished by subtracting all log exposure values from that of test material #1, which served as the reference point and was gelatin coated film base. In essence, this was the same as arbitrarily choosing this as the zero point in the log exposure values scale. Since the scale is logarithmic in character, it was equivalent to assigning a relative value of 1.00 (anti-log of 0.00) to the intensity of light that was transmitted by the Wratten #49B and #16 filters in superposition.

The invention will be further illustrated by the following examples.

EXAMPLE I

Unsensitized photographic emulsions ranging in sensitivity from a Lippmann to a Cine Negative were tested. The results are given in Table I.

The values in the last column are the anti-logarithms of those in the second column. All the emulsions tested showed a small but definite fluorescence. The actual intensity is, however, 10 to 15 times that recorded. First, only that portion of the fluorescence was recorded which was directed toward the recording material, but as much fluorescence was directed away from this material as was toward it; hence, at least a factor of two is involved here. Second, only that portion of the emission was recorded which escaped loss by scatter. A piece of test material #2 (unsensitized emulsion) when measured with red light in a color densitometer, gave a reading of 0.90. Since neither silver halides, gelatin nor film base have any appreciable absorption in this region, this can be taken as a measure of the loss of light by scatter; a factor of 8 (anti-logarithm of 0.90) is involved. Thus, the actual fluorescent intensity may be sixteen times that recorded.

Table I.—Fluorescence of some native photographic emulsions (no additives)

| Test Material | Log Exposure Value | Relative Intensity of Fluorescence |
| --- | --- | --- |
| Test Material #1 | 0.00 | 1.00 |
| Lippmann | 0.12 | 1.32 |
| Paper | 0.05 | 1.12 |
| Positive | 0.11 | 1.29 |
| Negative | 0.10 | 1.26 |

EXAMPLE II

Different amounts of 1,1'-diethyl-2,2'-cyanine iodide (a pseudocyanine dye exhibiting J-band sensitization, subsequently referred to as dye A) were added to a positive emulsion which was coated on a cellulose ester film base, dried, and compared with coatings of plain gelatin, unsensitized emulsion, and gelatin containing the sensitizing dye. The following results tabulated in Tables II and III were obtained. Here, only the relative intensities of the emitted fluorescence is given. The numbers represent the anti-logarithms of the corresponding log exposure values.

Table II.—Fluorescence of emulsion containing dye A

| Conc. Dye, mgs./kg. Emulsion | Test Materials | | | |
| --- | --- | --- | --- | --- |
| | #1 Gelatin Coated Base | #2 Unsensitized Emulsion | #3 Dyed Gelatin | #4 Dyed Emulsion |
| 10 | 1.00 | 1.86 | 1.23 | 3.24 |
| 20 | 1.00 | 2.00 | 1.32 | 4.57 |
| 40 | 1.00 | 2.00 | 1.41 | 6.46 |
| 80 | 1.00 | 2.00 | 1.55 | 7.94 |
| 160 | 1.00 | 2.00 | 1.66 | 5.75 |

Let the assumption be made that each entity comprising a dye sensitized emulsion acts independently. Experiment has shown that neither film base nor plain gelatin fluoresce when excited by blue light. Then the relative intensity of the fluorescence from a dye sensitized emulsion should be equal to the sum of the intensities from dyed gelatin (test material #3) and unsensitized emulsion (test material #2). In Table III is given a comparison of this sum with the experimentally determined value.

Table III.—Fluorescence of dyed emulsion (dye A) compared to that of sum of fluorescence of emulsion and dye

| Conc. Dye mgs./kg. Emulsion | Unsensitized Emul. #2 | Dyed Gelatin #3 | Sum of #2 and #3 | Experimental Value | Difference |
| --- | --- | --- | --- | --- | --- |
| 10 | 1.86 | 1.23 | 3.09 | 3.24 | +0.15 |
| 20 | 2.00 | 1.32 | 3.32 | 4.57 | +1.25 |
| 40 | 2.00 | 1.41 | 3.41 | 6.46 | +3.05 |
| 80 | 2.00 | 1.55 | 3.55 | 7.94 | +3.39 |
| 160 | 2.00 | 1.66 | 3.66 | 5.75 | +2.09 |

An examination of the values in the last column in both Tables II and III shows that a maximum fluorescence and a maximum superadditivity effect is obtained at a concentration of 80 milligrams of dye per kilogram of wet emulsion. Sensitometric data for these coatings indicate that at this concentration of dye, the sensitivity is at a maximum both for yellow light (induced range) as well as for blue light exposures.

EXAMPLE III

Example II was repeated with the exception that the pseudocyanine was replaced by an unsymmetrical carbocyanine referred to in the table as dye B. The results are given in Tables IV and V.

Table IV.—Fluorescence of emulsion containing dye B

| Conc. Dye mgs./kg. Emulsion | Test Materials | | | |
| --- | --- | --- | --- | --- |
| | #1 | #2 | #3 | #4 |
| 10 | 1.00 | 4.00 | 2.45 | 3.89 |
| 20 | 1.00 | 4.00 | 3.02 | 8.51 |
| 40 | 1.00 | 3.71 | 5.13 | 14.13 |
| 80 | 1.00 | 3.71 | 7.24 | 23.44 |
| 160 | 1.00 | 3.63 | 12.88 | 23.44 |

Table V.—Fluorescence of dyed emulsion (dye B) compared to that of sum of fluorescence of emulsion and dye

| Conc. Dye mgs./kg. Emulsion | Unsensitized Emul. #2 | Dyed Gelatin #3 | Sum of #2 and #3 | Experimental Value | Difference |
| --- | --- | --- | --- | --- | --- |
| 10 | 4.00 | 2.45 | 6.45 | 3.89 | −2.56 |
| 20 | 4.00 | 3.02 | 7.02 | 8.51 | +1.49 |
| 40 | 3.71 | 5.13 | 8.84 | 14.13 | +5.31 |
| 80 | 3.71 | 7.24 | 10.95 | 23.44 | +12.49 |
| 160 | 3.63 | 12.88 | 16.51 | 23.44 | +6.93 |

Again the maximum fluorescence and superadditivity occurs at a concentration of 80 milligrams of dye per kilo of wet emulsion, and sensitometric data indicates a maximum blue and yellow sensitivity for this concentration of dye.

The dyes A and B above form a class with a common pattern. Emulsions sensitized with them exhibit a superadditive fluorescence. They emit light which is greater than the simple sum of the fluorescence of the dye and the native emulsion separately. The superadditivity reaches a maximum at the same concentration of dye as does the photographic sensitivity of the dyed emulsion.

EXAMPLE IV

The main fluorescence obtained in the case of a positive emulsion apparently coincided with that dye concentration needed for a coverage of grain surface. Each type of emulsion had a characteristic value for the dye concentration needed to produce maximum fluorescence. A series of other emulsions were tested, differing in grain size from almost colloidal state to approximately one micron. The values obtained are shown in Tables VI to VIII. All the emulsions below are sensitized with 1,1'-diethyl-2,2'-cyanine iodide.

Table VI.—Fluorescence of Lippmann-type emulsion

| Conc. Dye, mgs./kg. Emulsion | 0 | 15 | 30 | 60 | 125 | 250 | 500 | 1,000 |
| --- | --- | --- | --- | --- | --- | --- | --- | --- |
| Relative Fluorescence | 1.51 | 3.16 | 4.90 | 7.94 | 8.91 | 15.14 | 9.12 | 2.95 |

The maximum is at a dye concentration of 250 mgs. per kg. of wet emulsion.

Table VII.—Fluorescence of negative-type emulsion

| Conc. Dye, mgs./kg. Emulsion | 0 | 10 | 20 | 40 | 80 |
|---|---|---|---|---|---|
| Relative Fluorescence | 1.82 | 2.57 | 3.80 | 4.37 | 3.98 |

The maximum is at a dye concentration of 40 mgs. per kg. of wet emulsion.

Table VIII.—Fluorescence of paper-type emulsion

| Conc. Dye, mgs./kg. Emulsion | 0 | 10 | 20 | 40 | 80 | 160 | 320 |
|---|---|---|---|---|---|---|---|
| Relative Fluorescence | 1.12 | 1.86 | 2.82 | 2.82 | 4.68 | 5.62 | 1.66 |

The maximum here is at a dye concentration of 160 mgs. per kg. of wet emulsion.

It is evident that each emulsion exhibited a characteristic value for the concentration of sensitizing dye giving maximum fluorescence. This was also the concentration needed to produce maximum induced sensitivity and maximum loss of native sensitivity.

EXAMPLE V

A series of emulsions, sensitized by the above pseudocyanine, were prepared that differed in the amount of silver iodide they contained. The distribution of grain sizes was approximately alike. The results are tabulated in Table IX.

Table IX.—Effect of iodide content on fluorescence

| Mol. Percent Iodide | Fluorescence at Different Dye Conc. (mgs./kg. Emulsion) | | | | |
|---|---|---|---|---|---|
| | 0 mg. | 20 mgs. | 40 mgs. | 80 mgs. | 160 mgs. |
| A—0.00 | 1.20 | 5.89 | 9.33 | 8.91 | 6.17 |
| B—1.00 | 1.41 | 5.62 | 10.72 | 9.55 | 4.90 |
| C—2.00 | 1.38 | 6.92 | 7.08 | 6.76 | 6.31 |
| D—3.00 | 1.38 | 5.01 | 8.51 | 7.94 | 5.25 |
| E—4.00 | 1.38 | 5.50 | 8.71 | 7.76 | 4.90 |
| F—5.00 | 1.20 | 5.37 | 6.76 | 5.50 | 4.17 |

In all cases the maximum effect is at a dye concentration of 40 milligrams per kilogram of emulsion. On the average, there appears to be a slightly higher effect when the iodide content is approximately 1 mole percent. With higher iodide content the fluorescence appears to diminish. The sensitivities of the emulsions appear to vary in the same manner, both in the native and in the induced ranges.

The exposures used in these experiments were sufficient to yield H and D curves for the recording film whose straight line portions extended to a point that corresponded to a density of 4.00 in the optical step wedge. This was approximately 100 times the normal exposure for Triple S Pan. However, it was only slightly on the over exposure side for the test materials. When the exposure was increased several times beyond this, some interesting effects were noted in the case of the positive emulsion sensitized with dye A. The emitted light did not record the corresponding increases. This is shown in Table X, for the case of the positive emulsion sensitized with 80 milligrams of 1,1'-diethyl-2,2'-cyanine iodide.

Table X.—Changes in fluorescence of dye A with changing exposure time

| Time of Exposure in Seconds | 8 | 15 | 30 | 60 | 120 |
|---|---|---|---|---|---|
| Relative Intensity of Fluorescence | 8.91 | 10.96 | 8.71 | 6.17 | 4.17 |

The noted decrease in fluorescence cannot be explained by the formation of photolytic silver within the test material. The density of a strip of test material given many times the exposures used increased in value only 0.15 or one-half stop. From this, it is apparent that the ability of the test material to emit fluorescence was a function of exposure. This was further tested by giving strips of the sensitized positive emulsion pre-exposures to blue light. The pre-exposed strips together with an unexposed one were then tested for fluorescence. The results are tabulated in Table XI.

Table XI.—Changes in fluorescence of dye A with different pre-exposures to blue light (Wratten No. 49B)

| Time of Pre-Exposure in Seconds | Fresh | 5 | 10 | 20 | 40 | 80 |
|---|---|---|---|---|---|---|
| Relative Fluorescence | 7.24 | 6.46 | 6.17 | 4.68 | 2.95 | 2.69 |

Since the ability of the test material to fluoresce appeared to be affected by the presence of a latent image, the manner of formation of the latent image should be immaterial. According to present concepts, latent images formed by blue or yellow light exposures are indistinguishable. Quenching experiments were repeated using yellow light for the pre-exposure. Fluorescence was then measured in the usual way. The results are given in Table XII.

Table XII.—Changes in fluorescence of dye with different pre-exposures to yellow light (Wratten No. 16)

| Time of Pre-Exposure in Seconds | Fresh | 5 | 10 | 20 | 40 | 80 |
|---|---|---|---|---|---|---|
| Relative Intensity of Fluorescence | 7.59 | 7.76 | 7.94 | 7.59 | 6.92 | 5.37 |

Sensitometric tests indicated that the emulsion tested gave somewhat greater densities when exposed through a Wratten #16 filter than when exposed for the same length of time through a Wratten #49B filter. Hence, the pre-exposure used for the latter experiment was somewhat greater than that for the first. Only when the pre-exposure to yellow was extended several more stops did the relative fluorescence fall to a value comparable to that obtained with an 80 second blue light pre-exposure.

In this instance, at least, it appears as if differences might exist in the properties of latent images formed by blue or yellow light.

EXAMPLE VI

This dependence of fluorescense upon exposure was utilized to prepare a direct dupe. A strip of test material (positive emulsion sensitized with 80 milligrams) was exposed with blue light under a negative for 80 seconds. The negative was removed and the test material placed over a Wratten #16 filter. Under the filter was placed a strip of Triple S Pan film. The pack was then given an overall exposure to blue light, with the test material facing the light. The triple S Pan film was developed in A-47 for ten minutes. A duplicate of the original negative was thus obtained.

As a result of the exposure under the negative, there was formed within the test material a positive pattern consisting of areas capable of emitting fluorescence. Upon the subsequent exposure, the emission of the fluorescent areas was recorded upon Triple S Pan film. Where the first exposure was heavy, the test material lost its ability to fluoresce, and a corresponding low density was obtained in the recording material. Where the first exposure was low, the test material retained its ability to fluoresce and a relatively heavy deposit was obtained in the recording material.

It will be readily apparent that this procedure permits the production of duplicate prints without developing the intermediate latent image. The procedure also does away with one of the two development steps inherent with all reversal procedures.

Figure 2:
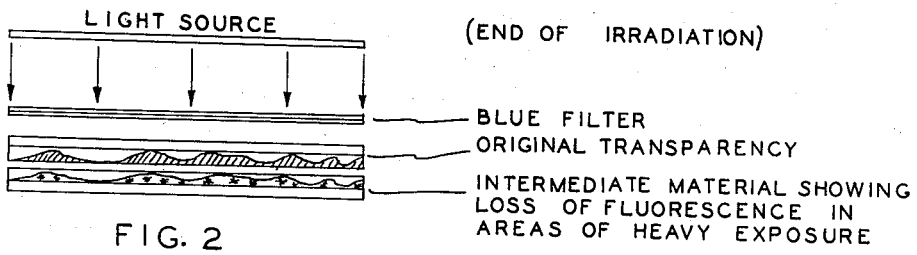
Figure 3:
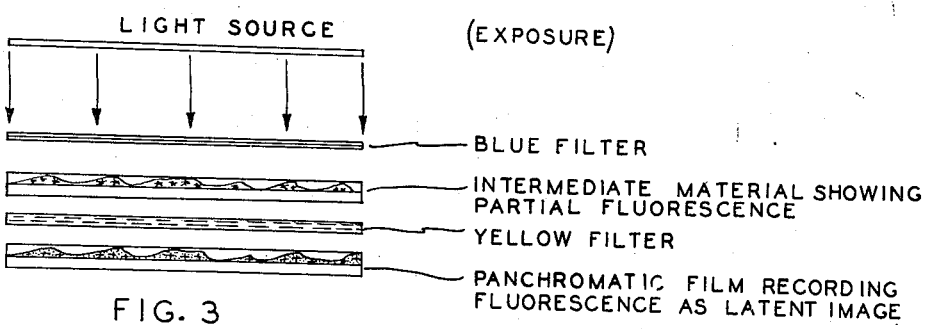
Figure 4:

The invention is further illustrated by the accompanying self-explanatory drawing which demonstrates the formation of the duplicate image. Figure 1 shows the overall fluorescence of the intermediate material when first exposed with blue light. Figure 2, illustrating the end of the first exposure, shows the loss of fluorescence in the areas of heavy exposure and the retention of fluorescence in the areas of low exposure. Figure 3 shows the formation of the latent image in the areas of the recording material which are irradiated by the fluorescent areas of the intermediate material. Figure 4 shows the developed direct duplicate.

It will be evident from the foregoing descriptions that the invention is susceptible to various modifications. For instance, in place of the sensitizing dyes illustrated in the examples, there can be used other sensitizing dyes which are capable of increasing the fluorescence of photographic emulsions. Therefore, the scope of the invention is to be limited solely by the appended claims.

We claim:

1. A process of preparing a direct duplicate from a transparent original which comprises exposing through said original with blue light a photographic material carrying on a transparent support a silver halide emulsion containing a sensitizing dye capable of increasing the fluorescence of said emulsion, for a time in excess of that required for the formation of a latent image and sufficient to destroy in the heavily exposed areas the ability to fluoresce without affecting the ability to fluoresce in the areas of low exposure, removing said original, exposing with blue light through said exposed intermediate printing material, a duplicating material carrying on a suitable support a panchromatic emulsion while interposing a yellow filter between said intermediate and said duplicating material, said yellow filter absorbing all of the blue light but transmitting the fluorescent light emitted by said intermediate material to be recorded upon said panchromatic emulsion, and developing in a black and white developer the latent image in the duplicating material to form a duplicate picture of said original.

2. A process according to claim 1 wherein said transparent original is a negative.

3. A process according to claim 1 wherein said transparent original is a positive.

4. A process according to claim 1 wherein the emulsion of the intermediate material is sensitized with 1,1'-diethyl-2,2'-cyanine iodide.

References Cited in the file of this patent

UNITED STATES PATENTS 2,331,492     Michaelis _____ Oct. 12, 1943

UNITED STATES PATENT OFFICE
CERTIFICATE OF CORRECTION

Patent No. 2,865,744　　　　　　　　　　　　　　　　December 23, 1958

Joseph S. Friedman et al.

It is hereby certified that error appears in the printed specification of the above numbered patent requiring correction and that the said Letters Patent should read as corrected below.

Column 4, line 54, for "The main" read -- The maximum --; line 62, for "are" read -- were --; column 4, line 71, Table VI, third column thereof, for "3 16" read -- 3.16 --; column 5, line 22, for "maximum loss" read -- minimum loss --.

Signed and sealed this 19th day of May 1959.

(SEAL)
Attest:

KARL H. AXLINE
Attesting Officer

ROBERT C. WATSON
Commissioner of Patents